(12) United States Patent
Challenger et al.

(10) Patent No.: US 7,689,947 B2
(45) Date of Patent: Mar. 30, 2010

(54) DATA-DRIVEN FINITE STATE MACHINE ENGINE FOR FLOW CONTROL

(75) Inventors: James R. Challenger, Garrison, NY (US); Louis R. Degenaro, White Plains, NY (US); James R. Giles, Yorktown Heights, NY (US); Paul Reed, Brookline, MA (US)

(73) Assignee: International Business Machines Corporation, Armonk, NY (US)

( * ) Notice: Subject to any disclaimer, the term of this patent is extended or adjusted under 35 U.S.C. 154(b) by 498 days.

(21) Appl. No.: 11/619,691

(22) Filed: Jan. 4, 2007

(65) Prior Publication Data

US 2008/0164908 A1 Jul. 10, 2008

(51) Int. Cl.
*G06F 17/50* (2006.01)

(52) U.S. Cl. .................... 716/4; 716/1; 716/5

(58) Field of Classification Search ............ 716/1, 716/4, 5
See application file for complete search history.

(56) References Cited

U.S. PATENT DOCUMENTS 7,039,893 B2  5/2006  DenBraber

2005/0081192 A1*  4/2005  DeLine et al. ............ 717/126

OTHER PUBLICATIONS http://www.igda.org/ai/report-2004/fsm.html,"Working Group on Finite State Machines".
http://www.codeproject.com/csharp/xmlfsm.asp, "XML Finite State Machine in C#" by Kevin Stuart, 2002.
Flora-Holmquist,Morton,O'Grady,Staskauskas,"The Virtual Finite-State Machine Design and Implementation Paradigm",Bell Labs Technical Journal, Winter 1997.
F.Wagner, "VFSM Executable Specification,Computer Systems and Software Engineering",IEEE Computer Society,May 4-8, 1992.
Ferdinand Wagner,Peter Wolstenholme,"Modeling and Building Reliable,Re-Usable Software", ECBS'03,Huntsville,Apr. 2003.

* cited by examiner

*Primary Examiner*—Thuan Do
(74) *Attorney, Agent, or Firm*—George Willinghan; August Law, LLC

(57) ABSTRACT

Finite state machines are provided to run instances of user-defined routines within a computing system. The finite state machines and updates to the finite state machines are user-defined and are checked for compliance with one or more prescribed schemas by a finite state machine engine. Compliant finite state machine specifications are interpreted for the plurality of states and transitions that constitute the finite state machine. Requested instances of a finite state machine specification are initiated by the finite state machine engine, which creates proxies to monitor the current state of any given requested instance.

33 Claims, 6 Drawing Sheets

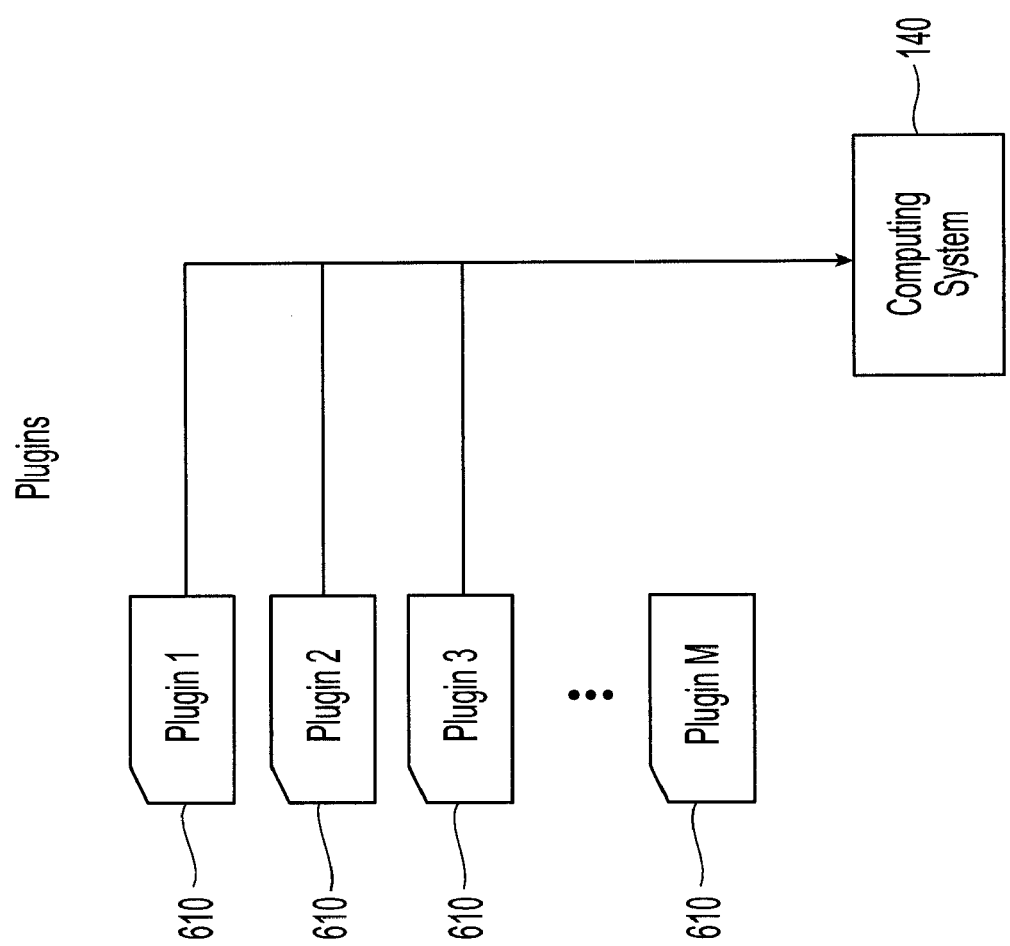

DATA-DRIVEN FINITE STATE MACHINE ENGINE FOR FLOW CONTROL

STATEMENT REGARDING FEDERALLY SPONSORED RESEARCH

The invention disclosed herein was made with U.S. Government support. The Government has certain rights in this invention.

FIELD OF THE INVENTION

The present invention relates to information processing systems. More particularly, the present invention relates to methods and apparatus for data driven finite state machine engines for flow control in a distributed computing environment.

BACKGROUND OF THE INVENTION

Finite State Machines (FSMs), also known as finite automata, depict behavioral models composed of inputs, states, transitions, and outputs (or actions). Two well known finite state machine types are Moore and Mealy FSMs. In Moore machines the output depends on state, whereas in Mealy machines the output depends on transition. In practice, many FSMs employ both types of machines in combination. These FSM abstractions were described by their namesakes in the late 1950's and have been widely utilized in a variety of fields (mathematics, logic, linguistics, computer science, etc.) for the past half century. Other FSMs have also been described, as have methods to transform one type into another.

Specified FSMs can be classified into two groups: recognizers and transducers. Recognizers produce binary output: yes/true (recognized) or no/false (not recognized). Transducers generate output based on input and/or current state and are often used to control applications. Transducers transform (or map) ordered sets of input events into corresponding ordered sets of output events.

FSMs are used with some regularity to control computer systems and applications, both in hardware and software. In many applications, the specified FSMs are hard-wired or hard-coded, as the case may be, into the system or application. In general, the FSM is developed based upon a specific application, and methods or systems are required to provide for the creation or development of the FSM in accordance with the application requirements. Some customizable general purpose FSMs have been devised to aide in the development of control mechanisms for computer systems and applications.

An example of a system and method for implementing a FSM based upon configuration data is disclosed in U.S. Pat. No. 7,039,893. A FSM Engine is used to generate specific configurations for different state machines based on configuration data using a common method. This common configuration structure is used for all state machine implementations, and changes in the state machine design drive changes in the configuration data instead of in executable software. Multiple software state machines are thus implemented using a configurable approach. In addition, state machine processing is performed periodically and state transition events are handled without the need for an event driven operating system. The disclosed approach, however, has several deficiencies. For example, a new FSM is needed for each instance, and customized executable code, e.g., as described in the preferred embodiment the "configuration data" are C language code and header files, is produced from the FSM model. In addition, a new production-compilation-deployment cycle is needed to incorporate FSM model changes into running systems.

An alternative approach utilized web services-business process execution language (WS-BPEL) that provides both externalization and an execution engine. However, WS-BPEL does not enforce FSM control flows. Therefore, WS-BPEL flows can be written that do not conform to any FSM Specification. Another disadvantage of WS-BPEL is that there are no guarantees to model the entire flow, e.g. all states and state transitions, thus failing to provide any level of assurance or provability.

Expressing an FSM externally as Extensible Markup Language (XML) is also well known in the Artificial Intelligence (AI) and computer gaming literature (see for example http://www.igda.org/ai/report-2004/fsm.html or http://www.codeproject.com/csharp/xmlfsm.asp). These externally specified FSMs have not separated execution from state maintenance.

More generally, FSMs have been defined using state tables as in "The Virtual Finite State Machine Implementation Paradigm" (see http://www.lucent.com/minds/techjournal/pdf/winter_97/paper08.pdf). Again, these techniques have been used to generate customized code.

The prior art does not teach how to employ an externally defined FSM for flow control such that changes can be implemented during runtime "on the fly".

SUMMARY OF THE INVENTION

The present invention is directed to methods and systems that provide for a data driven finite state machine engine for flow control.

Systems and methods in accordance with the present invention overcome the limitations of the prior art by eliminating the need for a new production-compilation-deployment cycle. Therefore, changes can be applied to the runtime engine during runtime, e.g., changes can be made "on the fly". In addition, the runtime engine utilized by embodiments of the present invention is a runtime interpreter and is not generated code, facilitating changes during runtime, i.e. flexibility, while at the same time enhancing human understandability. Moreover, during runtime, multiple instances of the same FSM can share a single engine instance, reducing complexity and resource consumption.

In one exemplary method in accordance with the present invention, finite state machines are utilized in a computing system to run instances of user-defined routines. Initially, one or more schemas are defined that contain the validity parameters for any finite state machine. User-generated finite state machine specifications, which contain a plurality of states and a plurality of transitions between the states, are evaluated for compliance with the schemas. In one embodiment, each one of the plurality of transitions includes at least one method invocation on at least one object instance. In one embodiment, at least one transition in the plurality of transitions is a time-based transition. The object instances can be determined at runtime. In one embodiment, the plurality of transitions is used to process event objects that contain computing system context additional to proxy state.

Compliant user-generated finite state machine specifications are interpreted. When a request is received from a computing system for an instance of the user-generated finite state machine specification, the requested instance of the user-generated finite state machine specification is initiated. One or more of the plurality of transitions in the finite state machine specification are used to advance the instance of the user-generated finite state machine specification through the plurality of states. In one embodiment, a notification mechanism to be invoked when processing at least one of the plurality of transitions in the requested instance of the finite state machine specification is specified. In addition, externally defined states and transitions can be annotated with descriptive information, for example in the form of name-value pairs. In one embodiment, a user-generated finite state machine specification containing properties associated with a state, a transitions or combinations thereof is interpreted, for example by the interpretive FSM engine. The FSM then makes this information available to one or more computing systems on demand, i.e. the defined properties are communicated to the computing systems.

In order to facilitate compliance with the prescribed schema, the defined schema is communicated to one or more users and the finite state machine engine that receives the user-generated finite state machine specifications and evaluates these specifications for compliance with the schema. These user-generated finite state machine specifications can be expressed as an extensible mark-up language document or as a diagram in a unified modeling language editing tool.

In one embodiment in order to execute the requested instance of the finite state machine, the current state of the initiated requested instance of the user-generated finite state machine is recorded in an externalized queue. Preferably, the externalized queue is a proxy that represents the current state of the initiated requested instance of the user-generated finite state machine specification.

In addition to receiving and initiating instances of new finite state machine specifications, updates to existing specifications can also be handled. In one embodiment, a user-generated finite state machine specification update is received from a user at the finite state machine engine and is evaluated for compliance with the schemas. These user-generated finite state machine specification updates include updates to at least one previously interpreted user-generated finite state machine specification. As with the original finite state machine specifications, the user-generated finite state machine specification update is interpreted, and the previously interpreted user-generated finite state machine specification is updated in accordance with the user-generated finite state machine specification update. These updates include, but are not limited to, adding one or more transitions, deleting one or more transitions, changing an existing transition, adding method calls that perform an existing transition, removing method calls that perform an existing transition, adding an object map, deleting an object map, changing an object map, adding a state, removing a state, changing a state, adding a state entry method call, deleting a state entry method call, adding a state exit method call, deleting a state exit method call and combinations thereof.

BRIEF DESCRIPTION OF THE DRAWINGS

FIG. 6 is a schematic representation of an embodiment of plugins that can be employed by a computing system for execution of finite state machine transition and state methods.

DETAILED DESCRIPTION

Systems and methods in accordance with exemplary embodiments of the present invention capitalize on the advantages offered by externalization as a means of documentation, structured bookkeeping and the use of interchangeable componentry to provide for the management of large numbers of similar entities. As used herein, externalization includes utilizing a schema that describes valid instances of managed entities, including finite state machine (FSM) states and transitions. Structured bookkeeping manages large numbers of evolving entities over time and space. Interchangeable componentry facilitates making updates during runtime without rebooting or restructuring a running deployment.

In one embodiment, the present invention includes a FSM Engine that processes FSM Specifications that are defined externally, for example by one or more users, in accordance with a defined schema that is communicated to those users. In general, the function and structure of FSMs are known to those of skill in the art. The FSM Specification is created using any suitable language. In one embodiment, the FSM Specification is specified by creating an XML document in accordance with the defined schema. Alternatively, the FSM is expressed as a Unified Modeling Language (UML) document. XML and UML are well known to those of skill in the art. The use of these languages provides the advantage of explicit documentation of the process specified by the FSM Specification and of a means for directing the FSM Engine to proceed through the steps of that process. In addition, the steps in the process and the relationships of the steps to each other are clearly documented. Therefore, both the steps in the FSM Specification, the states in the FSM Specification and the transitions between the steps are easily added, removed and changed.

In one embodiment, the implementation of each step in the process is externally defined in the XML document as an executable method on a (e.g. Java) class, and the state of a particular instance of the FSM Specification is recorded in externalized queues or databases or other suitable persistence mechanisms for passing between steps. In one embodiment, a given instance of the FSM Specification is represented using an object instance and/or a proxy. This loose coupling between FSM steps and executable methods to perform these steps, that is not a direct orchestration via, for example, compiled Java method calls, allows for increased flexibility and understandability. In addition, different versions of an FSM Specification can be easily and simultaneously employed during runtime, facilitating code migrations.

Figure 1:
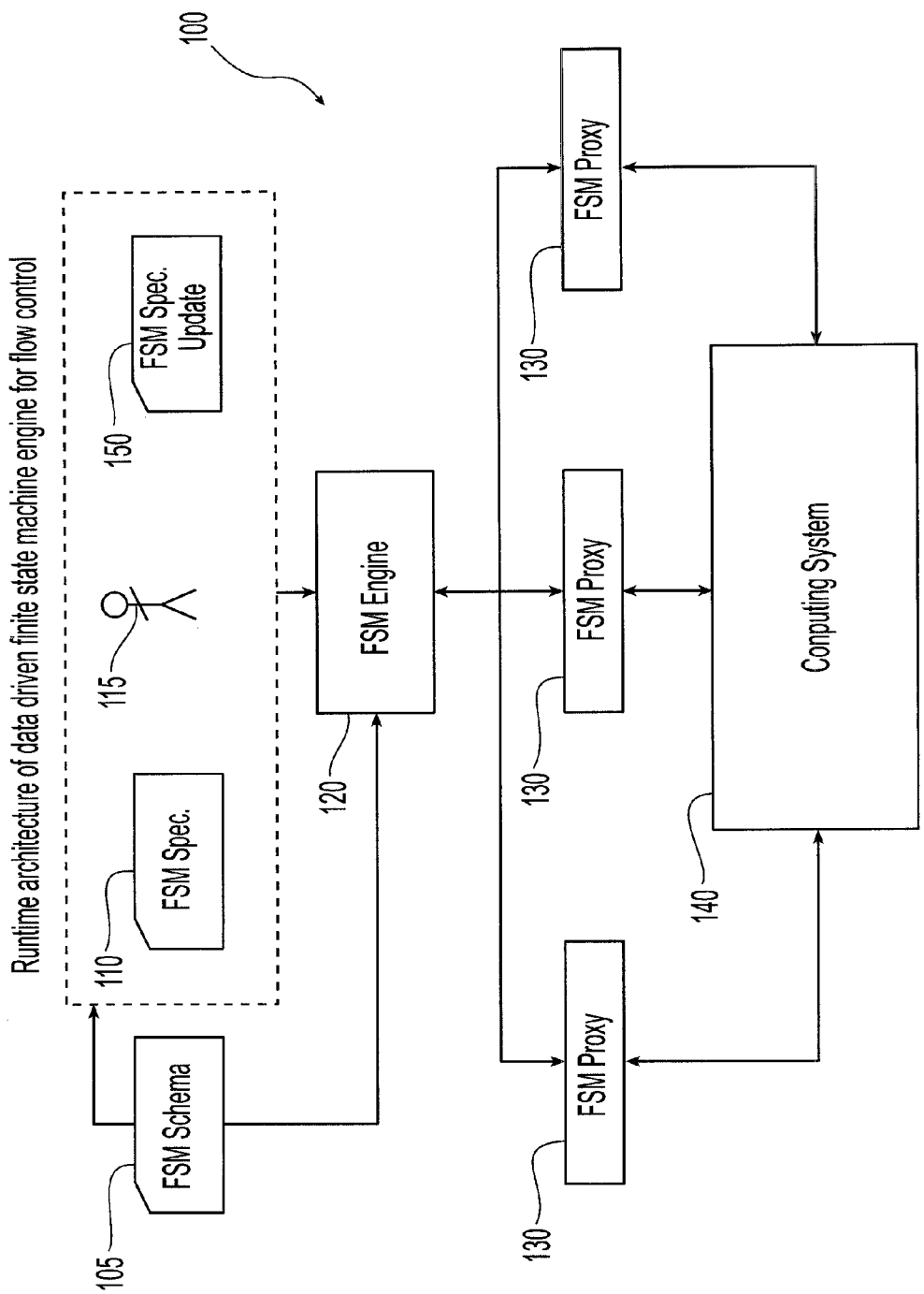
FIG. 1 is a schematic representation of an embodiment of a runtime architecture of a data driven finite state machine engine for flow control in accordance with the present invention.

Referring initially to FIG. 1, an embodiment of a runtime architecture of a data driven FSM Engine for flow control 100 for use in accordance with the present invention is illustrated. The runtime architecture includes an interpretative FSM Engine 120. The FSM Engine 120, unlike previously utilized systems, has the ability to act interpretatively, i.e. to interpret one or more user-generated or externally-generated FSM Specifications that are communicated to the FSM Engine in a valid format. Interpretation of each FSM Specification includes identifying the plurality of states, i.e. initial states, intermediate states and final states, and the plurality of transitions between these states that constitute the FSM Specification. The FSM Engine 120 can interpret the function or meaning of both FSM Specifications 110 and FSM Specification Updates 150 that are communicated to it from an external source such as one or more users 115. In addition to interpretation, the FSM Engine can evaluate each communicated FSM Specification for compliance with a defined FSM Schema 105.

Initially, typically one or alternatively a plurality of acceptable FSM Schemas are defined. The FSM Schema 105 defines the requirements and options that are utilized by the FSM Engine 120 for runtime interpretation of the FSM Specifications and the FSM Specification Updates. Therefore, each FSM Schema contains the parameters for a valid FSM Specification. Each FSM Schema is communicated to the FSM Engine and to one or more users 115. The users utilize the communicated FSM Schema to develop FSM Specifications that are in compliance with the schema. Following initiation of the FSM Engine 120, new FSM Specifications 110 and FSM Specification Updates 150 are delivered or communicated to the FSM Engine 120 during runtime from the users 115. The FSM Engine 120 evaluates each user-defined FSM Specification and FSM Specification Update to determine whether or not the FSM Specification or FSM Specification Update is in compliance with the corresponding defined FSM schema, i.e. whether or not it is a valid FSM Specification or valid FSM Specification Update. Invalid specifications and specification updates cannot be processed by the FSM Engine and are rejected. In one embodiment, this rejection is communicated to the user that communicated the specification or update to the FSM Engine.

When a FSM Specification 110 or FSM Specification Update 150 is received by the FSM Engine and is determined to be in compliance with the FSM Schema, the FSM Engine interprets the FSM Specification or the FSM Specification Update during runtime. Interpretation of the FSM Specification includes identifying the states and transitions included in the FSM Specification. The FSM Specification Update 150 also defines additions, deletions and changes to an existing FSM Specification 110 that was previously communicated to, interpreted by and processed by the FSM Engine 120. The FSM Specification Update is also evaluated by the FSM Engine for compliance with the FSM Schema and interpreted.

The compliant, i.e. valid, interpreted FSM Specification is available for use by one or more computing systems 140. These computing systems include, but are not limited to, network systems, individual computers and applications running within a computing environment. The computing system, desiring the functionality represented by the FSM Specification, contacts the FSM Engine to request an FSM Specification runtime instance, also referred to as the FSM Instance, of the FSM Specification associated with the desired functionality. Each FSM Instance may be represented by an FSM Proxy 130. In response to the FSM Specification request, the FSM Engine initiates the requested FSM Instance of the FSM Specification. Execution of that FSM Instance includes utilizing one or more of the plurality of transitions contained in the FSM Specification to advance the FSM Instance through the plurality of states to obtain the desired final state or process outcome.

In one embodiment, in order to facilitate initiation of the requested FSM Instance, the FSM Engine creates an externalized queue or database to record the current state of the initiated instance of the FSM Specification. The externalized queue is passed between states of the FSM Instance. Preferably, the FSM Engine creates a proxy to represent the current state of the initiated requested instance of the finite state machine specification. The current state information as represented by the FSM Proxy is available to the computing system. The use of a proxy to represent an instance of the FSM Specification also facilitates expanding the functionality of a given FSM Engine, because the FSM Engine can utilize proxies to control a plurality of concurrent instances of a single FSM Specification or concurrent instances of a plurality of FSM Specifications. Therefore, in one embodiment, each valid FSM Instance is represented by a FSM Proxy 130. Existing FSM Instances represented by the FSM Proxies 130 remain in effect while subsequent instances are enabled or changed. An FSM Proxy 130 is used to represent a given runtime instance of each compliant FSM Specification 110. Each FSM Proxy 130 represents an independently managed FSM. The FSM Proxy is the entity utilized by the computing system 140 to advance the FSM, i.e. to move the FSM between states, by sending events to it.

FSM Engines are utilized by each computing system 140 to manage FSM's and to enforce defined parameters in those FSM's. In one embodiment, a given computing system 140 utilizes a single FSM Engine 120 that is shared for a plurality of diverse FSM Specifications. Each one of the plurality of FSMs is represented by at least one FSM Proxy 130. Alternatively, a plurality of FSM Engines is used, one FSM Engine for each FSM Specification 110.

Figure 5:
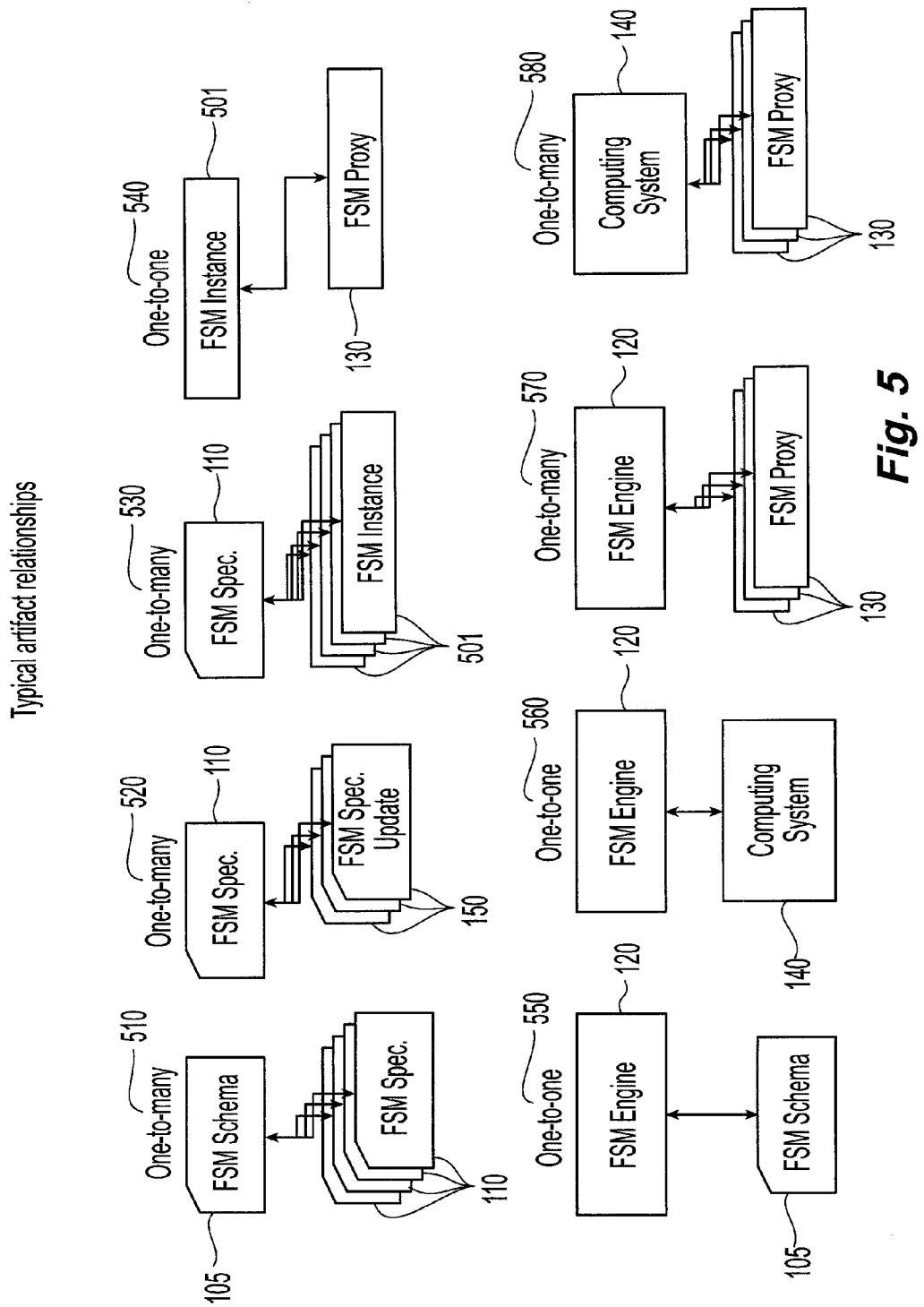
FIG. 5 is schematic representation of an embodiment of typical artifact relationships.

Referring to FIG. 5, exemplary embodiments of typical artifact relationships in accordance with the present invention are illustrated. These artifact relationships describe how a typical implementation of the present invention can represent various articles of important information to create a finite state machine engine for flow control. In one embodiment, a one-to-many 510 relationship exists between a given FSM Schema 105 and all of the FSM Specifications 110. For example, a plurality of different and distinct finite state machines can be expressed that conform to the FSM Schema 105. The different FSM's can include, for example, a FSM to calculate income tax, a FSM to control jobs of a software application each composed of distributed program elements and a FSM to control an assembly line robot.

There is also a one-to-many 520 relationship between a given FSM Specification 110 and a plurality of FSM Specification Updates 150 associated with that FSM Specification 110. Therefore, a given finite state machine can be subjected to multiple or successive changes over time. For example, a FSM used to calculate income tax is updated yearly to enact revisions required for conformance with the current tax codes. In another example, a FSM for controlling jobs of a software application may be updated frequently to accept new job types.

A one-to-many 530 relationship exists between a given FSM Specification 110 and a plurality of associated FSM Instances 501. Therefore, each finite state machine can be used many times, and each use of a given finite state machine is independent of other, either previous or subsequent, uses of that finite state machine. By way of example, a given FSM is specified to process income tax returns. A first instance involves processing George Washington's income tax for fiscal year 1796, and another instance involves processing Abraham Lincoln's income tax for fiscal year 1862. Yet another instance involves processing Theodore Roosevelt's income tax for fiscal year 1900. Although a given FSM specification is associated with many FSM Instances, a one-to-one 540 relationship exists between a given FSM Instance 501 and an FSM Proxy 130. This one-to-one relationship provides for a level of indirection, e.g., a FSM Proxy, between the actual FSM Instance 501 managed by an FSM Engine 120 and a Computing System 140 employing the FSM Instance. In some cases, the FSM Proxy is simply another name for the FSM Instance.

Typically, there is a one-to-one 550 relationship between a given FSM Schema 105 and an associated FSM Engine 120, implying that usually an FSM Engine understands only one language for specifying FSM's. Alternatively (not shown), multiple FSM Schemas could be supported by a single FSM Engine as would be understood by one of ordinary skill in the art. By way of analogy, a single FSM Engine supporting multiple FSM Schemas is akin to teaching a person who only understands a single language, such as English, how to understand more than one language, such as English, Spanish, and Chinese.

In one embodiment, a one-to-one 560 relationship exists between a given FSM Engine 120 and a given computing system 140. Alternatively (not shown), for efficient use of computing resources, a single FSM Engine can support multiple computing systems, multiple FSM Specifications, etc. In addition, a computing system 140 could employ multiple FSM Engines 120, or an FSM Engine 120 could support multiple computing systems 140. Thus, although this relationship is typically one-to-one, it could also be many-to-many.

Typically, there is a one-to-many 570 relationship between an FSM Engine 120 and FSM Proxies 130. This is, in essence, another way of stating the combination of the one-to-many relationship 530 between an FSM Specification 110 and FSM Instances 501 together with the one-to-one relationship 540 between an FSM Instance 501 and an FSM Proxy 130.

Typically, there is a one-to-many 580 relationship between a given computing system 140 and FSM Proxies 130. This means that a computing system 140 can have multiple finite state machines, as represented by FSM Proxies 130, simultaneously active. Thus, as recited above, an FSM that process tax returns may have many instances as represented by proxies active simultaneously: one for George Washington's 1796 tax return; another for George Washington's 1797 tax return; etc.

Figure 2:
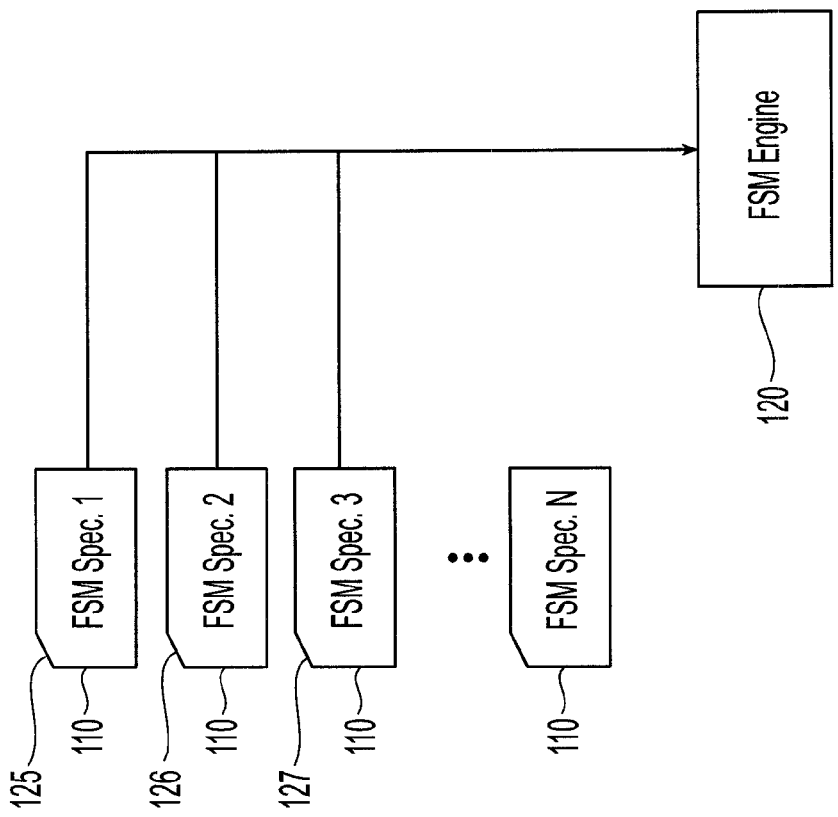
FIG. 2 is a schematic representation of an embodiment of simultaneous interpretative support for multiple FSM Specifications.

Referring to FIG. 2, an extended diagram showing multiple FSM Specifications 110 interpreted by a common FSM Engine 120 is given. As was described above, each FSM Specification 110 conforms to a pre-defined FSM Schema 105 (FIG. 1), which assures the ability of the FSM Engine 120 to interpret that FSM Specification. As illustrated, the FSM Engine 120 simultaneously manages a plurality, e.g. N, of diverse FSM Specifications 110. For example, the first FSM Specification 125 defines the FSM that controls application batch job submission. The second FSM Specification 126 defines the FSM that controls application interactive session management, and the third FSM Specification 127 defines the FSM that controls system lifecycle.

Figure 3:
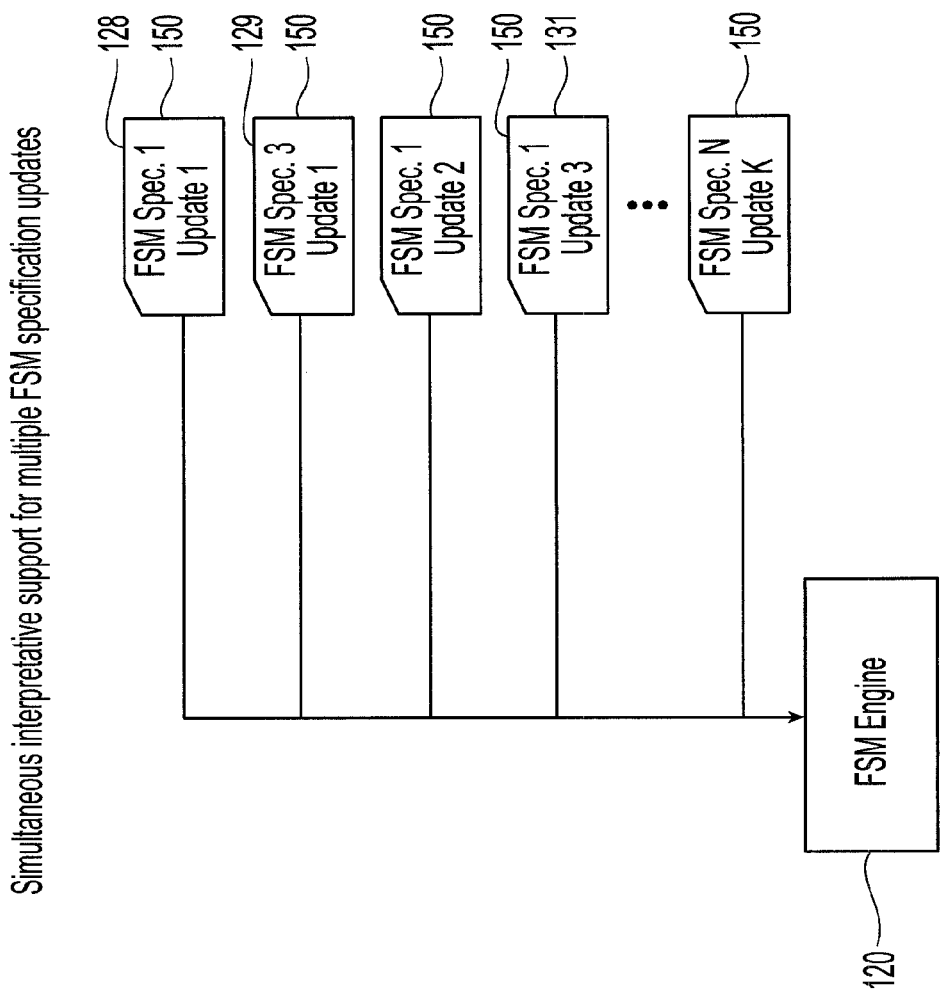
FIG. 3 is a schematic representation of an embodiment of simultaneous interpretative support for multiple FSM Specification Updates.

Referring to FIG. 3, an extended diagram showing multiple FSM Specification Updates 150 reconciled by a common FSM Engine 120 is given. As illustrated, the FSM Engine 120 manages a plurality of FSM Specification Updates 150, e.g. K updates, that correspond to the previously communicated and interpreted plurality of FSM Specifications 110, e.g. N specifications. The FSM Engine manages these updates during runtime. For example, the first update for the first FSM Specification 128 adds a new transition to a state for batch job processing. The first update for the third FSM Specification 129 adds a new state, and transitions to and from that state, for interactive session management. The third update for the first FSM Specification 131 removes a state and corresponding transitions for batch job processing.

Figure 4:
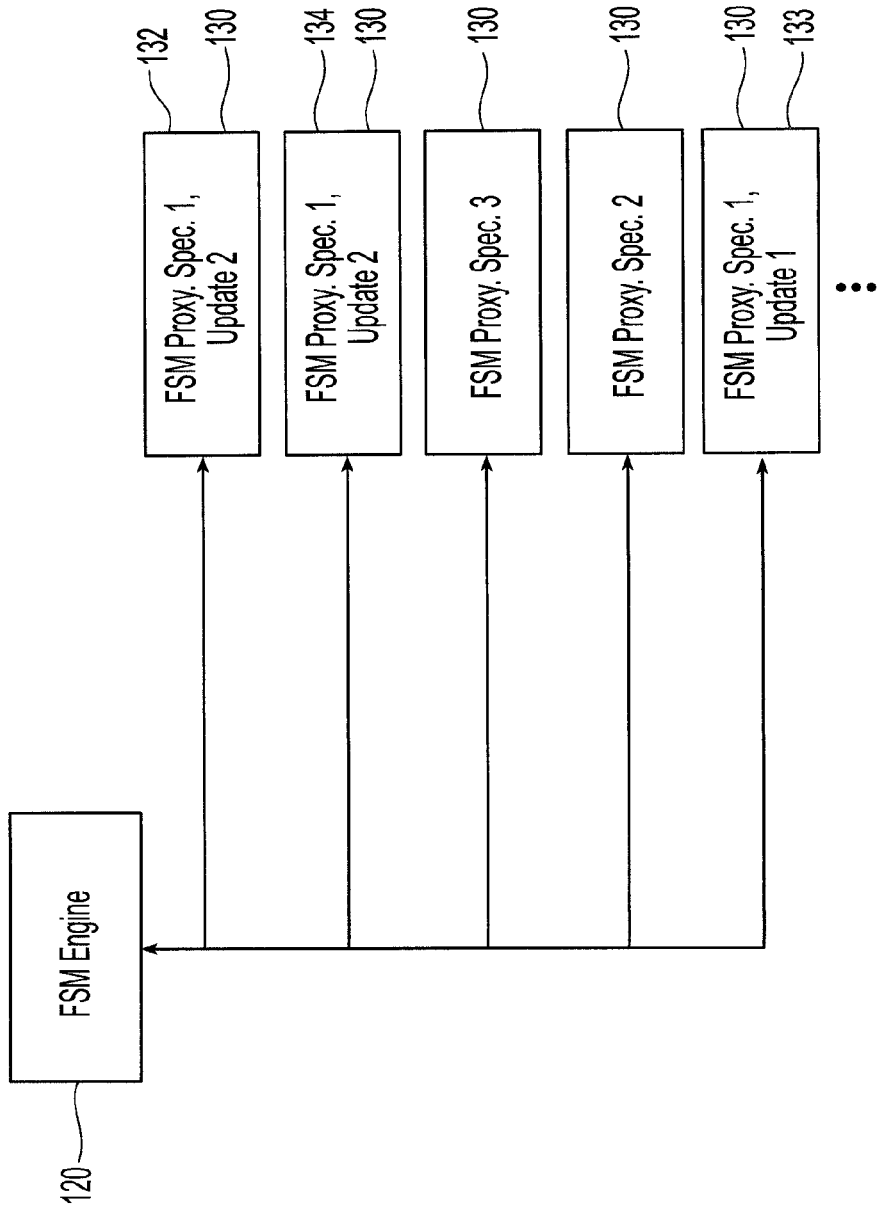
FIG. 4 is a schematic representation of an embodiment of simultaneous interpretative support for multiple FSM proxies with updates.

Referring to FIG. 4, an extended diagram showing multiple FSM Proxies 130 with updates associated with an FSM Engine 120 is given. As illustrated, a plurality of FSM Proxies 130 or a plurality of versions of a single FSM Proxy 130 are active simultaneously. For example, an FSM Proxy 130 representing a FSM controlling batch job processing, i.e. for a first FSM Specification, has several versions running in parallel. A first version 133 includes 3 states and 3 transitions, and a second version 132 includes only 2 states and 2 transitions. Another second version 134 representing another FSM Instance also includes those same two states and transitions.

XML schemas are known to those of skill in the art. In general, the XML schema dictates the rules for creating a valid XML document that contains the FSM Specification. An exemplary embodiment of an XML schema definition for FSM Specifications in accordance with the present invention is as follows.

```
<?xml version="1.0" encoding="UTF-8"?>
<xsd:schema xmlns:xsd="http://www.w3.org/2001/XMLSchema"
xmlns:fsm="http://www.ibm.com/fsm" elementFormDefault="qualified"
targetNamespace="http://www.ibm.com/fsm">
<xsd:element name="fsm" type="fsm:fsmType"/>
<xsd:complexType name="fsmType">
    <xsd:sequence>
        <xsd:element maxOccurs="unbounded" minOccurs="0"
name="logger" type="fsm:loggerType"/>
        <xsd:element maxOccurs="unbounded" minOccurs="0"
name="objectmap" type="fsm:objectMap"/>
        <xsd:element maxOccurs="1" minOccurs="1" name="initial"
type="fsm:initialState"/>
        <xsd:element maxOccurs="1" minOccurs="1" name="final"
type="fsm:finalState"/>
        <xsd:element maxOccurs="unbounded" minOccurs="1"
name="state" type="fsm:stateType"/>
    </xsd:sequence>
    <xsd:attribute name="id" type="xsd:token" use="required"/>
    <xsd:attribute name="wildcard" type="xsd:token" use="optional"/>
</xsd:complexType>
<xsd:complexType name="initialState">
    <xsd:attribute name="id" type="xsd:token" use="required"/>
</xsd:complexType>
<xsd:complexType name="finalState">
    <xsd:attribute name="id" type="xsd:token" use="required"/>
</xsd:complexType>
<xsd:complexType name="stateType">
    <xsd:sequence>
        <xsd:element maxOccurs="unbounded" minOccurs="0"
name="property" type="fsm:nvPairType"/>
        <xsd:element maxOccurs="unbounded" minOccurs="0"
name="transition" type="fsm:transitionType"/>
    </xsd:sequence>
    <xsd:attribute name="id" type="xsd:token" use="required"/>
    <xsd:attribute name="number" type="xsd:decimal" use="optional"/>
</xsd:complexType>
<xsd:complexType name="transitionType">
    <xsd:sequence>
        <xsd:element maxOccurs="unbounded" minOccurs="0"
name="method" type="fsm:methodType"/>
    </xsd:sequence>
    <xsd:attribute name="id" type="xsd:token" use="required"/>
    <xsd:attribute name="nextState" type="xsd:token" use="optional"/>
</xsd:complexType>
<xsd:complexType name="nvPairType">
    <xsd:attribute name="name" type="xsd:token"/>
    <xsd:attribute name="value" type="xsd:token"/>
</xsd:complexType>
<xsd:complexType name="methodType">
    <xsd:attribute name="id" type="xsd:token" use="optional"/>
    <xsd:attribute name="name" type="xsd:token" use="required"/>
    <xsd:attribute name="object" type="xsd:token" use="required"/>
</xsd:complexType>
<xsd:complexType name="objectMap">
    <xsd:attribute name="id" type="xsd:token" use="required"/>
    <xsd:attribute name="type" type="fsm:objectType" use="required"/>
```

-continued

```
    <xsd:attribute name="plugin" type="xsd:token" use="optional"/>
    <xsd:attribute name="instance" type="xsd:token" use="optional"/>
    <xsd:attribute name="properties" type="xsd:token" use="optional"/>
</xsd:complexType>
<xsd:simpleType name="objectType">
    <xsd:restriction base="xsd:token">
        <xsd:enumeration value="managed"/>
        <xsd:enumeration value="unmanaged"/>
        <xsd:enumeration value="runtime"/>
    </xsd:restriction>
</xsd:simpleType>
<xsd:complexType name="loggerType">
    <xsd:attribute name="id" type="xsd:token" use="optional"/>
    <xsd:attribute name="object" type="xsd:token" use="required"/>
    <xsd:attribute default="true" name="enabled" type="xsd:token"
use="optional"/>
</xsd:complexType>
</xsd:schema>
```

As illustrated, a valid FSM Specification in accordance with the FSM schema includes one initial state (name="initialState"), one final state (name="finalState") and one or more intermediate states (name="stateType"). The FSM Specification can optionally include one or more object maps (name="objectmap"). The object maps are optional, and in at least one embodiment, the FSM Specification does not include any object maps.

The initial state has an identification (name="id", type="initialState"). In addition, the final state has an identification (name="id", type="finalState"). Intermediate states (name="state", type="stateType") also have an identification (name="id"). In addition, the intermediate states can have one or more properties (name="property", type="nvPairType") and one or more transitions (name="transition", type="transitionType"). However, any given intermediate state may have neither properties nor transitions. Each intermediate state can also have an optional decimal number (name="number") to aide in organization by computing systems, applications or operators.

In accordance with the FSM schema, a valid FSM Specification 110 is required to have an "initialState", a "finalState" and a "stateType". In one embodiment, the "initialState", "finalState" and "stateType" are all the same. Alternatively, all three are distinct states.

A given transition includes an identification (name="id") and a next state (name="nextState"). In addition, the transition can have one or more associated methods (name="method", type="methodType"). However, the associated methods are optional, and the transition may not have any associated methods. The methods constitute an ordered list of executable code fragments to carry out the transition. During runtime, a transition is triggered by a send event operation that advances the finite state machine according to the FSM Specification by means of executing the associated methods, if any.

In one embodiment, transitions can also have one or more properties (name="property", type="nvPairType"—not shown). Again, the properties are optional, and any given transition may not have any properties. Each property includes a name (name="name") and a value (name="value"). Properties allow association of user-defined data with states and transitions within an FSM Specification. These associated user-defined data are made accessible during runtime.

A given associated method includes an identity (name="id"), a called execution point (name="name") and a corresponding called object (name="object"). The called object contains the executed code. During runtime, the execution point of the corresponding object is invoked to process the associated transition from the current state to the next state of the present FSM Instance, preferably as represented by an FSM Proxy. The object reference is resolved through one of a number of available ways as described below.

In one embodiment, states can also have one or more entry methods and one or more exit methods. These method sequences are specified in a fashion similar to that of transitions recited above.

Referring to FIG. 6, an embodiment of a plug-in architecture for use in conjunction with a computing system 140 is illustrated. In one embodiment, the computing system 140 is assembled using a plurality of plug-ins 610, i.e. M plug-ins, which are identifiable by characteristics including plug-in name and type, among others. Systems and methods in accordance with the present invention employ these plug-ins, and alternatively other or additional executable code, to carry out one or more methods including a transition, state entry or state exit as described above.

An object map has an identity (name="id"), an object type (name=objectType), and optionally a plug-in, instance and properties. The object type contains one of an enumeration of values: "managed", "unmanaged", or "runtime". Each enumerated type indicates how to resolve the corresponding object. For "managed", the singleton instance is located and utilized. For "unmanaged", a new instance is created for each FSM Proxy 130. For "runtime", the object is looked up by name in an object map provided by the computing system 140, which may be an application program, at runtime.

As was described above, FSM Specifications are externally created and evaluated by the FSM Engine for compliance with the defined FSM schema. In an embodiment where the FSM Specification is expressed using XML, an exemplary XML for a valid FSM Specification in compliance with the defined FSM schema is as follows.

```xml
<?xml version="1.0"?>
<fsm xmlns:xsd="http://www.w3.org/2001/XMLSchema-instance"
    xmlns="http://www.ibm.com/fsm"
    xsd:schemaLocation="http://www.ibm.com/fsm fsm.xsd"
    id="jobfsm"
    wildcard="ANY"
>

<logger id="fsmlogger" object="fsmlogger" />

<objectmap id="fsmlogger" type="runtime" />
<objectmap id="displogger"
        type="managed"
        plugin="com.ibm.Logger "
        instance="dispatcher" />

<objectmap id="fsmimpl" type="runtime" />
<objectmap id="dispatcherStateProcessor" type="runtime" />
<objectmap id="stateCanceling" type="runtime" />
<objectmap id="statePreDispatchCancel" type="runtime" />
<objectmap id="stateDispatching" type="runtime" />
<objectmap id="stateRunning" type="runtime" />

<initial id="start" />
<final   id="exit" />

<!-- 0. Start -->

<state id="start" number="0">
   <property name="cancelable" value="true"/>
   <property name="macroState" value="predispatch"/>
   <property name="updatedb" value="false"/>

<transition id="enqueue-job" nextState="submitted">
      <method object="fsmimpl" name="fsmEnqueueJob" />
   </transition>
</state>

<!-- 1. Submitted -->

<state id="submitted" number="1">
   <property name="cancelable" value="true"/>
   <property name="macroState" value="predispatch"/>
   <property name="updatedb" value="false"/>
```

```xml
<transition id="parsing" nextState="parsing">
</transition>
<transition id="c-hold" nextState="held">
  <method object="fsmimpl" name="fsmEnqueueToHold" />
</transition>
<transition id="suspend" nextState="held">
  <method object="fsmimpl" name="fsmEnqueueToHold" />
</transition>
<transition id="evict" nextState="held">
  <method object="fsmimpl" name="fsmEnqueueToHold" />
</transition>
<transition id="cancel" nextState="cleanup">
  <method object="fsmimpl" name="fsmEnqueueToCancel" />
</transition>
</state>

<!-- 2. Parsing -->

<state id="parsing" number="2">
  <property name="cancelable" value="true"/>
  <property name="macroState" value="predispatch"/>
  <property name="updatedb" value="false"/>

<transition id="parsed" nextState="template-map">
    <method object="fsmimpl" name="fsmDgmMap" />
  </transition>
  <transition id="c-hold" nextState="held">
    <method object="fsmimpl" name="fsmEnqueueToHold" />
  </transition>
  <transition id="suspend" nextState="held">
    <method object="fsmimpl" name="fsmEnqueueToHold" />
  </transition>
  <transition id="evict" nextState="held">
    <method object="fsmimpl" name="fsmEnqueueToHold" />
  </transition>
  <transition id="cancel" nextState="cleanup">
    <method object="fsmimpl" name="fsmEnqueueToCancel" />
  </transition>
  <transition id="error" nextState="cleanup">
    <method object="fsmimpl" name="fsmEnqueueToCancel" />
  </transition>
</state>

<!-- 3. Resource match -->
```

```xml
<state id="resource-match" number="3">
  <property name="cancelable" value="true"/>
  <property name="macroState" value="predispatch"/>
  <property name="updatedb" value="false"/>

<transition id="resource-match-complete" nextState="optimizing">
    <method object="fsmimpl" name="fsmEnqueueToOptimizer" />
  </transition>
  <transition id="c-hold" nextState="held">
    <method object="fsmimpl" name="fsmDgmUnmap" />
    <method object="fsmimpl" name="fsmEnqueueToHold" />
  </transition>
  <transition id="suspend" nextState="held">
    <method object="fsmimpl" name="fsmDgmUnmap" />
    <method object="fsmimpl" name="fsmEnqueueToHold" />
  </transition>
  <transition id="evict" nextState="held">
    <method object="fsmimpl" name="fsmDgmUnmap" />
    <method object="fsmimpl" name="fsmEnqueueToHold" />
  </transition>
  <transition id="cancel" nextState="cleanup">
    <method object="fsmimpl" name="fsmDgmUnmap" />
    <method object="fsmimpl" name="fsmEnqueueToCancel" />
  </transition>
  <transition id="error" nextState="cleanup">
    <method object="fsmimpl" name="fsmDgmUnmap" />
    <method object="fsmimpl" name="fsmEnqueueToCancel" />
  </transition>
  <transition id="resource-match-fail" nextState="cleanup">
    <method object="fsmimpl" name="fsmDgmUnmap" />
    <method object="fsmimpl" name="fsmEnqueueToCancel" />
  </transition>
</state>

<!-- 4. DGM template map -->

<state id="template-map" number="4">
  <property name="cancelable" value="true"/>
  <property name="macroState" value="predispatch"/>
  <property name="updatedb" value="false"/>

<transition id="template-map-complete" nextState="resource-match">
    <method object="fsmimpl" name="fsmEnqueueToResourceMatcher" />
```

```xml
    </transition>
    <transition id="c-hold" nextState="held">
      <method object="fsmimpl" name="fsmDgmUnmap" />
      <method object="fsmimpl" name="fsmEnqueueToHold" />
    </transition>
    <transition id="suspend" nextState="held">
      <method object="fsmimpl" name="fsmDgmUnmap" />
      <method object="fsmimpl" name="fsmEnqueueToHold" />
    </transition>
    <transition id="evict" nextState="held">
      <method object="fsmimpl" name="fsmDgmUnmap" />
      <method object="fsmimpl" name="fsmEnqueueToHold" />
    </transition>
    <transition id="cancel" nextState="cleanup">
      <method object="fsmimpl" name="fsmDgmUnmap" />
      <method object="fsmimpl" name="fsmEnqueueToCancel" />
    </transition>
    <transition id="error" nextState="cleanup">
      <method object="fsmimpl" name="fsmDgmUnmap" />
      <method object="fsmimpl" name="fsmEnqueueToCancel" />
    </transition>
    <transition id="template-map-fail" nextState="cleanup">
      <method object="fsmimpl" name="fsmDgmUnmap" />
      <method object="fsmimpl" name="fsmEnqueueToCancel" />
    </transition>
    <transition id="ANY" nextState="cleanup">
      <method object="fsmimpl" name="fsmDgmUnmap" />
      <method object="fsmimpl" name="fsmEnqueueToCancel" />
    </transition>
</state>

<!-- 5. Optimizing -->

<state id="optimizing" number="5">
  <property name="cancelable" value="true"/>
  <property name="macroState" value="predispatch"/>
  <property name="updatedb" value="false"/>

<transition id="optimized" nextState="dgm-instantiate">
    <method object="fsmimpl" name="fsmDgmInstantiate" />
  </transition>
  <transition id="c-hold" nextState="held">
    <method object="fsmimpl" name="fsmDgmUnmap" />
    <method object="fsmimpl" name="fsmEnqueueToHold" />
```

```xml
</transition>
<transition id="suspend" nextState="held">
  <method object="fsmimpl" name="fsmDgmUnmap" />
  <method object="fsmimpl" name="fsmEnqueueToHold" />
</transition>
<transition id="evict" nextState="held">
  <method object="fsmimpl" name="fsmDgmUnmap" />
  <method object="fsmimpl" name="fsmEnqueueToHold" />
</transition>
<transition id="cancel" nextState="cleanup">
  <method object="fsmimpl" name="fsmDgmUnmap" />
  <method object="fsmimpl" name="fsmEnqueueToCancel" />
</transition>
<transition id="error" nextState="cleanup">
  <method object="fsmimpl" name="fsmDgmUnmap" />
  <method object="fsmimpl" name="fsmEnqueueToCancel" />
</transition>
</state>

<!-- 5.5 DGM instantiate -->

<state id="dgm-instantiate" number="5.5">
  <property name="cancelable" value="true"/>
  <property name="macroState" value="predispatch"/>
  <property name="updatedb" value="false"/>

<transition id="job-instantiated" nextState="dispatching">
    <method object="dispatcherStateProcessor" name="doDispatching" />
  </transition>
  <transition id="c-hold" nextState="held">
    <method object="fsmimpl" name="fsmEnqueueToHold" />
  </transition>
  <transition id="suspend" nextState="held">
    <method object="fsmimpl" name="fsmEnqueueToHold" />
  </transition>
  <transition id="evict" nextState="held">
    <method object="fsmimpl" name="fsmEnqueueToHold" />
  </transition>
  <transition id="cancel" nextState="cleanup">
    <method object="fsmimpl" name="fsmEnqueueToCancel" />
  </transition>
  <transition id="dgm-instantiate-fail" nextState="cleanup">
    <method object="fsmimpl" name="fsmEnqueueToCancel" />
  </transition>
```

```xml
    <transition id="error" nextState="cleanup">
      <method object="fsmimpl" name="fsmEnqueueToCancel" />
    </transition>
    <transition id="ANY" nextState="cleanup">
      <method object="fsmimpl" name="fsmEnqueueToCancel" />
    </transition>
</state>

<!-- 6. Held -->

<state id="held" number="6">
  <property name="cancelable" value="true"/>
  <property name="macroState" value="inactive"/>
  <property name="updatedb" value="false"/>

<transition id="resume" nextState="submitted">
      <method object="fsmimpl" name="fsmEnqueueJob" />
    </transition>
    <transition id="m-released" nextState="submitted">
      <method object="fsmimpl" name="fsmEnqueueJob" />
    </transition>
    <transition id="n-restarted" nextState="submitted">
      <method object="fsmimpl" name="fsmEnqueueJob" />
    </transition>
    <transition id="cancel" nextState="cleanup">
      <method object="fsmimpl" name="fsmEnqueueToCancel" />
    </transition>
</state>

<!--
   There's no code associated with the "dispatching" state transitions.
   Events simply change the state but allow the current action to
   continue. The next event that occurs will then dictate a different
   action as decided by whatever state we happen to be in at the time.

For example, if a "suspend" comes in while dispatching, we must complete
   the dispatch before actually suspending. We therefore simple move to
   state "predispatch-suspend" so when the "o-dispatched" event comes in the
   "predispatch-suspend" state can then, and only then, start suspending
   the job.
-->

<!-- 7. Dispatching -->
```

```xml
<state id="dispatching" number="7">
  <property name="cancelable" value="true"/>
  <property name="macroState" value="running"/>
  <property name="updatedb" value="false"/>

<transition id="suspend" nextState="predispatch-suspend">
    <method object="dispatcherStateProcessor" name="doPredispatchSuspend" />
  </transition>
  <transition id="optimized" nextState="dispatching">
    <method object="dispatcherStateProcessor" name="doDispatchingRevisions" />
  </transition>
  <transition id="dispatched" nextState="running">
    <method object="dispatcherStateProcessor" name="doRunning" />
  </transition>
  <transition id="timedRetry" nextState="dispatching">
    <method object="dispatcherStateProcessor" name="doDispatchingRetry" />
  </transition>
  <transition id="cancel" nextState="predispatch-cancel">
  </transition>
  <transition id="evict" nextState="predispatch-evict">
    <method object="dispatcherStateProcessor" name="doPredispatchEvict" />
  </transition>
  <transition id="asynchronousStatusUpdate" nextState="dispatching">
    <method object="stateDispatching" name="doPeStatusRecordAndAnalyze" />
  </transition>
  <transition id="jobStateAnalysis" nextState="dispatching">
    <method object="stateDispatching" name="doJobStateAnalysis" />
  </transition>
  <transition id="ANY">
    <method object="dispatcherStateProcessor" name="doTransitionFault" />
  </transition>
</state>

<!-- 8. Running -->

<state id="running" number="8">
  <property name="cancelable" value="true"/>
  <property name="macroState" value="running"/>
  <property name="updatedb" value="false"/>

<transition id="optimized" nextState="running">
    <method object="dispatcherStateProcessor" name="doRunningRevisions" />
  </transition>
  <transition id="retry" nextState="dispatching">
```

```xml
      <method object="dispatcherStateProcessor" name="doRunningRetry" />
    </transition>
    <transition id="dispatched" nextState="running">
    </transition>
    <transition id="suspend" nextState="suspending">
      <method object="dispatcherStateProcessor" name="doSuspending" />
    </transition>
    <transition id="cancel" nextState="canceling">
      <method object="fsmimpl"            name="fsmDgmCondemn" />
      <method object="dispatcherStateProcessor" name="doCanceling" />
    </transition>
    <transition id="exit" nextState="exiting">
      <method object="dispatcherStateProcessor" name="doExiting" />
    </transition>
    <transition id="evict" nextState="evicting">
      <method object="dispatcherStateProcessor" name="doEvicting" />
    </transition>
    <transition id="asynchronousStatusUpdate" nextState="running">
      <method object="stateRunning" name="doPeStatusRecordAndAnalyze" />
    </transition>
    <transition id="jobStateAnalysis" nextState="running">
      <method object="stateRunning" name="doJobStateAnalysis" />
    </transition>
    <transition id="ANY">
      <method object="dispatcherStateProcessor" name="doTransitionFault" />
    </transition>
</state>

<!-- 9. Exiting -->

<state id="exiting" number="9">
  <property name="cancelable" value="false"/>
  <property name="macroState" value="terminating"/>
  <property name="updatedb" value="false"/>

<transition id="exitComplete" nextState="complete">
    <method object="dispatcherStateProcessor" name="doComplete" />
      <method object="fsmimpl" name="removeJob" />
  </transition>
  <transition id="ANY">
    <method object="dispatcherStateProcessor" name="doTransitionFault" />
  </transition>
</state>
```

```xml
<!-- 10. Suspended -->

<state id="suspended" number="10">
  <property name="cancelable" value="true"/>
  <property name="macroState" value="inactive"/>
  <property name="updatedb" value="false"/>

<transition id="resume" nextState="resuming">
  <method object="dispatcherStateProcessor" name="doResuming" />
  </transition>
  <transition id="cancel" nextState="resume-for-cancel">
  <method object="dispatcherStateProcessor" name="doResumeForCancel" />
  </transition>
  <transition id="evict" nextState="resume-for-eviction">
  <method object="dispatcherStateProcessor" name="doResumeForEviction" />
  </transition>
  <transition id="ANY">
  <method object="dispatcherStateProcessor" name="doTransitionFault" />
  </transition>
</state>

<!-- 11. Predispatch Suspend -->

<state id="predispatch-suspend" number="11">
  <property name="cancelable" value="true"/>
  <property name="macroState" value="predispatch"/>
  <property name="updatedb" value="false"/>

<transition id="error" nextState="predispatch-cancel">
  <method object="dispatcherStateProcessor" name="doPredispatchCancel" />
  </transition>
  <transition id="cancel" nextState="predispatch-cancel">
  <method object="dispatcherStateProcessor" name="doPredispatchCancel" />
  </transition>
  <transition id="evict" nextState="predispatch-evict">
  <method object="dispatcherStateProcessor" name="doPredispatchEvict" />
  </transition>
  <transition id="dispatched" nextState="suspending">
  <method object="dispatcherStateProcessor" name="doSuspending" />
  </transition>
  <transition id="resume" nextState="dispatching">
  <method object="dispatcherStateProcessor" name="doDispatching" />
  </transition>
  <transition id="ANY">
```

```xml
      <method object="dispatcherStateProcessor" name="doTransitionFault" />
    </transition>
</state>

<!-- 12. Evicting -->

<state id="evicting" number="12">
  <property name="cancelable" value="true"/>
  <property name="macroState" value="running"/>
  <property name="updatedb" value="false"/>

<transition id="cancel" nextState="canceling">
    <method object="fsmimpl"         name="fsmDgmCondemn" />
    <method object="dispatcherStateProcessor" name="doCanceling" />
  </transition>

<transition id="error" nextState="canceling">
    <method object="dispatcherStateProcessor" name="doCanceling" />
  </transition>

<transition id="evictionComplete" nextState="state: Held">
    <method object="dispatcherStateProcessor" name="doHeld" />
  </transition>

<transition id="ANY">
    <method object="dispatcherStateProcessor" name="doTransitionFault" />
  </transition>
</state>

<!-- 13. Predispatch Evict -->

<state id="predispatch-evict" number="13">
  <property name="cancelable" value="true"/>
  <property name="macroState" value="predispatch"/>
  <property name="updatedb" value="false"/>

<transition id="cancel" nextState="predispatch-cancel">
    <method object="dispatcherStateProcessor" name="doPredispatchCancel" />
  </transition>
  <transition id="error" nextState="canceling">
    <method object="dispatcherStateProcessor" name="doCanceling" />
  </transition>
  <transition id="dispatched" nextState="evicting">
    <method object="dispatcherStateProcessor" name="doEvicting" />
```

```xml
      </transition>
      <transition id="ANY">
        <method object="dispatcherStateProcessor" name="doTransitionFault" />
      </transition>
</state>

<!-- 14. Predispatch Cancel -->

<state id="predispatch-cancel" number="14">
  <property name="cancelable" value="false"/>
  <property name="macroState" value="predispatch"/>
  <property name="updatedb" value="false"/>

<transition id="dispatched" nextState="canceling">
    <method object="fsmimpl"             name="fsmDgmCondemn" />
    <method object="dispatcherStateProcessor" name="doCanceling" />
  </transition>

<transition id="timedRetry" nextState="predispatch-cancel">
    <method object="dispatcherStateProcessor" name="doDispatchingRetry" />
  </transition>

<transition id="asynchronousStatusUpdate" nextState="predispatch-cancel">
    <method object="stateDispatching" name="doPeStatusRecordAndAnalyze" />
  </transition>

<transition id="jobStateAnalysis" nextState="predispatch-cancel">
    <method object="stateDispatching" name="doJobStateAnalysis" />
  </transition>

<transition id="ANY">
    <!-- We deliberately ignore all transitions other than the above if we
         are cancelling -->
  </transition>

</state>

<!-- 15. Resume for Cancel -->

<state id="resume-for-cancel" number="15">
  <property name="cancelable" value="false"/>
  <property name="macroState" value="terminating"/>
  <property name="updatedb" value="false"/>
```

```xml
<transition id="resumeComplete" nextState="canceling">
   <method object="fsmimpl"         name="fsmDgmCondemn" />
   <method object="dispatcherStateProcessor" name="doCanceling" />
</transition>

<transition id="error" nextState="canceling">
   <method object="fsmimpl"         name="fsmDgmCondemn" />
   <method object="dispatcherStateProcessor" name="doCanceling" />
</transition>

<transition id="ANY">
   <method object="dispatcherStateProcessor" name="doTransitionFault" />
</transition>
</state>

<!-- 16. Resume for Eviction -->

<state id="resume-for-eviction" number="16">
  <property name="cancelable" value="true"/>
  <property name="macroState" value="running"/>
  <property name="updatedb" value="false"/>

<transition id="cancel" nextState="resume-for-cancel">
     <method object="fsmimpl"         name="fsmDgmCondemn" />
     <method object="dispatcherStateProcessor" name="doResumeForCancel" />
  </transition>

<transition id="error" nextState="state: Cancel">
     <method object="fsmimpl"         name="fsmDgmCondemn" />
     <method object="dispatcherStateProcessor" name="doResumeForCancel" />
  </transition>

<transition id="resumeComplete" nextState="evicting">
     <method object="fsmimpl"         name="fsmDgmCondemn" />
     <method object="dispatcherStateProcessor" name="doEvicting" />
  </transition>

<transition id="error" nextState="evicting">
     <method object="fsmimpl"         name="fsmDgmCondemn" />
     <method object="dispatcherStateProcessor" name="doEvicting" />
  </transition>

<transition id="ANY">
     <method object="dispatcherStateProcessor" name="doTransitionFault" />
```

```xml
    </transition>
</state>

<!-- 17. Cancelling -->

<state id="canceling" number="17">
  <property name="cancelable" value="false"/>
  <property name="macroState" value="terminating"/>
  <property name="updatedb" value="false"/>

<transition id="cancelComplete" nextState="complete">
    <method object="dispatcherStateProcessor" name="doComplete" />
    <method object="fsmimpl" name="removeJob" />
  </transition>

<transition id="timedRetry" nextState="canceling">
    <method object="dispatcherStateProcessor" name="doCancelingRetry" />
  </transition>

<transition id="asynchronousStatusUpdate" nextState="canceling">
    <method object="stateCanceling" name="doPeStatusRecordAndAnalyze" />
  </transition>

<transition id="jobStateAnalysis" nextState="canceling">
    <method object="stateCanceling" name="doJobStateAnalysis" />
  </transition>

<transition id="ANY">
    <method object="dispatcherStateProcessor" name="doTransitionFault" />
  </transition>
</state>

<!-- 18. Suspending -->

<state id="suspending" number="18">
  <property name="cancelable" value="true"/>
  <property name="macroState" value="running"/>
  <property name="updatedb" value="false"/>

<transition id="resume" nextState="resuming">
    <method object="dispatcherStateProcessor" name="doResuming" />
  </transition>

<transition id="cancel" nextState="resume-for-cancel">
```

```xml
    <method object="dispatcherStateProcessor" name="doResumeForCancel" />
  </transition>

<transition id="evict" nextState="resume-for-eviction">
    <method object="dispatcherStateProcessor" name="doResumeForEviction" />
  </transition>

<transition id="suspendComplete" nextState="suspended">
    <method object="dispatcherStateProcessor" name="doSuspended" />
  </transition>

<transition id="ANY">
    <method object="dispatcherStateProcessor" name="doTransitionFault" />
  </transition>
</state>

<!-- 19. Resuming -->

<state id="resuming" number="19">
  <property name="cancelable" value="true"/>
  <property name="macroState" value="running"/>
  <property name="updatedb" value="false"/>

<transition id="cancel" nextState="resume-for-cancel">
    <method object="dispatcherStateProcessor" name="doResumeForCancel" />
  </transition>

<transition id="evict" nextState="resume-for-eviction">
    <method object="dispatcherStateProcessor" name="doResumeForEviction" />
  </transition>

<transition id="resumeComplete" nextState="running">
    <method object="dispatcherStateProcessor" name="doRunning" />
  </transition>

<transition id="ANY">
    <method object="dispatcherStateProcessor" name="doTransitionFault" />
  </transition>
</state>

<!-- 20. Complete -->

<state id="complete" number="20">
  <property name="cancelable" value="false"/>
```

```xml
    <property name="macroState" value="completed"/>
    <property name="updatedb" value="true"/>

</state>

<!-- 21. Transition Fault -->

<state id="transition-fault" number="21">
    <property name="cancelable" value="false"/>
    <property name="macroState" value="error"/>
    <property name="updatedb" value="false"/>

</state>

<!-- 22. Cleanup -->

<state id="cleanup" number="22">
    <property name="cancelable" value="false"/>
    <property name="macroState" value="terminating"/>
    <property name="updatedb" value="false"/>

<transition id="exit" nextState="exit">
        <method object="fsmimpl" name="removeJob" />
    </transition>

</state>

<!-- 99. Exit -->

<state id="exit" number="99">
    <property name="cancelable" value="false"/>
    <property name="macroState" value="completed"/>
    <property name="updatedb" value="false"/>

</state>

</fsm>
```

The initial state of this FSM Specification is id="start", and the final state is id="exit". In addition, there are eight object map entries specified. The object map having id="fsmimpl" is of type "runtime" and is resolved by looking for a named object "fsmimpl" supplied by the computing system 140 during runtime. The object map having id="displogger" is of type "managed" and is resolved by finding the singleton instance supplied by the corresponding plug-in named "com.ibm.Logger". No "unmanaged" object map types are specified in this example.

One state has an id="submitted", and this state has three associated properties. These properties are cancelable, macroState and updatedb, and the corresponding values for these properties are true, predispatch and false. These properties are accessible to the computing system 140 via the FSM Proxy 130. Therefore, if the computing system 140 requests the value of the property cancelable while in the state "submitted", the value returned to the computing system is the corresponding value of cancelable, i.e. true. Alternatively, if the computing system 140 requests the value of the property cancelable while in the state "complete", the value returned to the computing system is the corresponding value of cancelable, i.e. false.

For the state having the id="parsing", there are six transitions, parsed, c-hold, suspend, evict, cancel and error. All of these transitions utilize the same object or code fragment when the transition executable code is invoked during runtime, which is the object or code fragment resolved by object map "fsminpl". The respective methods called on the resolved object or code fragment are fsmDgmMap, fsmEnqueueToHold, fsmEnqueueToHold, fsmEnqueueToHold, fsmEnqueueToCancel and fsmEnqueueToCancel. The respective next states that will be arrived at upon successful transition are template-map, held, held, held, cleanup and cleanup.

A transition specifies a list of zero or more object-method pairs that carry out the transition. By default, the transition leaves the FSM in the same state. Each transition may specify a new next state using nextState="state-id". Each transition having id="ANY" signifies a catch-all transition for cases when an erroneous transition is requested in that state. For example, when in state id="resuming", if an unrecognized transition event is encountered, for example "xxxx", then the catch-all transition is instead applied.

As was described above, each runtime instance of the FSM Specifications that are in compliance with the FSM schema are represented by externalized queues that are preferably FSM Proxies 130. In one embodiment, FSM Proxies are, in Java parlance, Serializable. FSM Proxies 130 are also known as virtual finite state machines. Method "createFsmProxy" creates new FSM Proxies. A new virtual finite state machine is created with each create method invocation. The FSM Proxy is constructed using any suitable language interface that facilitates communication with the computing system, including language implementations in software, firmware, and hardware. In one embodiment, the FSM Proxy is expressed using a Java interface. Suitable Java interfaces are known and available to those of skill in the art. The interface includes attributes and methods accessible to the computing system 140 for interfacing with FSM capabilities in accordance with exemplary embodiments of the present invention. An embodiment of an FSM Proxy Java interface is illustrated below.

```
package com.ibm;
/** FsmProxy Interface */
public interface IFsmProxy {
/** IFsmProxy factory: initialize engine and data object */
public IFsmProxy createFsmProxy(IFsmEngine engine, Object
dataObject);
public IFsmProxy createFsmProxy(String FsmSpecification, Object
dataObject);
/** attribute: logger */
public void setLogger(IFsmLogger logger);
public IFsmLogger getLogger( );
/** attribute: data object */
public void setDataObject(Object dataObject);
public Object getDataObject( );
/** attribute: exited */
public void setExited( );
public boolean isExited( );
/** attribute: previous state id */
public void setPreviousStateId(String previousStateId);
public String getPreviousStateId( );
/** attribute: current state id */
public void setCurrentStateId(String currentStateId);
public String getCurrentStateId( );
/** attribute: current event id */
public void setEventStateId(String currentEventId);
public String getCurrentEventId( );
/** attribute: previous event id */
public void setPreviousEventId(String previousEventId);
public String getPreviousEventId( );
/** attribute: current event object */
public void setCurrentEventObject(IFsmEventObject currentEventObject);
public IFsmEventObject getCurrentEventObject( );
/** attribute: previous event object */
public void setPreviousEventObject(IFsmEventObject
previousEventObject);
public IFsmEventObject getPreviousEventObject( );
/** method: get property by name */
public String getProperty(String propertyName);
/** method: wait for events to happen, then process them */
public void run( );
/** method: send event by name or event object */
public void sendEvent(String eventid);
public void sendEvent(IFsmEventObject eventObject);
/** method: send timer event after specified delay (unless canceled) */
public boolean sendTimedEvent(String eventId, long millisecondsDelay);
public boolean cancelTimedEvent( );
}
```

In the embodiment as illustrated, the attribute "DataObject" allows a computing system 140 to associate additional application-specific data per FSM. The DataObject may also be Serializable. The attribute "Exited" when set allows the virtual FSM to ignore spurious subsequent events. The attribute "CurrentState" holds the current state of the virtual FSM. The attribute "PreviousState" holds the previous state of the virtual FSM, if any. Whenever a transition causing a state advancement occurs, the virtual FSM moves the value of the "CurrentState" attribute to the "PreviousState" attribute and records the new state in the "CurrentState" attribute.

The attribute "CurrentEventId" holds the most recent transition event id, which is also referred to as send event id, of the virtual FSM. The attribute "PreviousEventId" holds the previous transition event id of the virtual FSM, if any. Whenever a transition event, which is also known as send event, is processed, the PreviousEventId receives the "CurrentEventId", and the "CurrentEventId" receives the new transition event. One of skill in the related art can contemplate saving more than just the previous state and event identity, such as previous J state/event pairs, which may be useful for debugging and other purposes.

The attribute "CurrentEventObject" contains the current event object being processed. The attribute "PreviousEventObject" contains the previous event object processed, if any.

These event objects offer each FSM-based application the opportunity to pass its own specific information when moving between FSM states and/or performing FSM transitions. Likewise, the previous J event objects may be remembered.

The method "run" waits for event objects to be queued and then processes each event object in the queue, one at a time. The next event object in queue is not processed until the current event object has completed processing. The method "sendEvent" queues event objects for processing. Queued event objects are processed by the "run" method, as recited above. The method "sendTimedEvent" queues a timed event that is only dequeued and processed by the "run" method once the allotted amount of time has expired. The "cancelTimedEvent" discards a previously queued timed event. This timing mechanism is useful for computing systems 140 that want to ensure that the virtual FSM does not get stuck in a state waiting for an event that may never occur.

Exemplary embodiments of the runtime architecture of the data driven FSM Engine for control flow in accordance with the present invention include additional features that aid in its operations. For example, an XML schema definition can be provided to constrain valid XML documents describing a desired FSM Specification. In addition, an XML parser can be used to validate correctly specified FSM Specifications submitted as XML documents. One or more XML document object map entries allow for the specification of (e.g., Java) object instances for use at runtime to execute state transitions of an FSM. Some object instances may be statically determined in advance, and other object instances may be dynamically determined at runtime. A valid FSM definition can optionally direct control among multiple objects per state transition.

For example, a transition may be defined that requires 5 sequential steps, each of which may be defined as a method call on a different Java object. Step one might be realized by invoking Object "A" method "1"; Step two might be realized by invoking Object "B" method "2", etc. In one embodiment, this orchestration is defined externally in an XML document as object map and transition information, which can be changed during runtime. Also, as recited above, an object binding can be as late as "runtime". Note that specifying "runtime" as the object map may be less desirable, since the actual object used may only be known to the FSM-based application itself, and thus external documentation is limited.

Further exemplary embodiments provide for support of direct and indirect specification, where each object map entry maps an identity ("id") to a plug-in. Suitable plug-ins include managed, unmanaged and runtime objects. A managed object is a global static instance with lifetime management that conforms to an interface containing lifecycle operations to initialize, start and release. An unmanaged object is one where a new instance is created each time a new reference is requested as opposed to a managed object where the same instance is reused for each new reference. For runtime objects, the object used is determined at runtime. In one embodiment, a table (e.g., a Java HashMap) is used to associate runtime objects with object map ids.

A correctly specified FSM XML document includes entries for initial state, ending state, intermediate state and transitions. Each state can include one or more transitions, and a given transition can include one or more methods. In addition, states can exist that do not contain any transitions, and transitions can exist that do not contain any methods. Each method for a transition specifies an object id and a method name on that object that is to be invoked, which will in full (or in part in conjunction with other specified object-method pairs) carry out the transition of which it is a member.

The present invention provides the ability to specify a notification mechanism that will be invoked when FSM events (e.g. a transition) occur. Notification can be sent to a logger, an editor, a monitor, a broadcaster and other interested parties.

In a preferred embodiment, the present invention outlines a Java implementation containing an FSM Engine, an extensible FSM proxy application program interface (API) and supporting classes that carry out runtime orchestration according to a valid FSM XML document.

In one embodiment, a new FSM Engine instance is employed for each FSM XML document specification. In another embodiment, a singleton FSM Engine instance is employed for each FSM XML document specification.

In one embodiment, one FSM Proxy instance is created for each FSM Instance, allowing applications to perform FSM Proxy life-cycle advancement operations. An FSM XML document defines the FSM states and transitions, and each FSM Proxy keeps track of a current state of its corresponding instance of the FSM Specification. The FSM Proxy carries all instance-specific information for an FSM Specification instance including the current state, the previous state and the transition that occurred to move from the previous state to the current state, if any. The FSM Proxy carries a data object that applications may use to carry the application-specific context information. In one preferred embodiment, the FSM Proxy is an extendable Serializable Java object. By extending, an FSM-based application can attach application context information to the FSM Proxy that is passed between states during transitions.

The present invention provides an FSM runtime event mechanism that allows for an application to signal transitions and the ability to pass along opaque event objects to the transition processing method. In one embodiment, the FSM Proxy is logically a full proxy for the FSM, and once initialized, the FSM Engine itself is not referenced until it is time to destroy the FSM proxy.

In one embodiment, an externally specifiable timing designation and runtime event mechanism allows for computing systems to signal transitions based on time events. Timings can be elapsed time, e.g., state.end.time−state.start.time, or absolute time relative to a time zone, e.g., 2005.12.31@11:59:59. When time expires, the corresponding state transition is automatically triggered.

In one embodiment, update-in-place changes, i.e. FSM Specification Updates, are made to an already interpreted FSM Specification. Examples of update-in-place changes include, but are not limited to, adding or deleting one or more transitions, changing an existing transition to add or remove one or more method calls that perform the transition and adding, deleting or changing one or more object maps. FSM proxies that have already been instantiated are not affected to the extent that the updates or changes are made to portions, i.e. states, of the FSM Specification that have already been passed. The update-in-place changes only affect future FSM proxy instances and future states of current FSM proxy instances and are not retroactive. In one embodiment, FSM proxy instances existing prior to update-in-place changes can, by policy, either continue to follow the original finite state machine or migrate to the new definition.

In one embodiment, transitions are abstracted so that an FSM user does not have to reference them directly. In this context, the FSM will specify only an FSM object id, and the computing system performs the object mapping rather than using the FSM object mapping mechanism.

In one embodiment, introspection is used to discover state and transitions as an aid in creating the externalized FSM XML document. That is, reverse engineering the FSM XML document is possible, for example in the event that the original gets lost.

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution. Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method for utilizing finite state machines in a computing system in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A method for utilizing finite state machines in a computing system, the method comprising:
    communicating a schema comprising validity parameters for a finite state machine to a finite state machine engine;
    using the finite state machine engine to:
        evaluate a user-generated finite state machine specification for compliance with the schema, the user-generated finite state machine specification comprising a plurality of states and a plurality of transitions;
        interpret the user-generated finite state machine specification;
        receive a request from a computing system for an instance of the user-generated finite state machine specification; and
        initiate the requested instance of the user-generated finite state machine specification; and
    using events from the computing systems that correspond to one or more of the plurality of transitions to advance the instance of the user-generated finite state machine specification through the plurality of states.

2. The method of claim 1, further comprising communicating the defined schema to one or more users.

3. The method of claim 1, further comprising using the finite state machine engine to:
    create at least one externalized queue; and
    record a current state of the initiated requested instance of the user-generated finite state machine in the externalized queue.

4. The method of claim 1, further comprising using the finite state machine engine to create a proxy to represent a current state of the initiated requested instance of the user-generated finite state machine specification.

5. The method of claim 1, further comprising using the finite state machine engine to:
    evaluate a user-generated finite state machine specification update for compliance with the schema, the user-generated finite state machine specification update comprising updates to at least one previously interpreted user-generated finite state machine specification;
    interpret the user-generated finite state machine specification update; and
    update the previously interpreted user-generated finite state machine specification in accordance with the user-generated finite state machine specification update.

6. The method of claim 5, wherein the updates comprise adding one or more transitions, deleting one or more transitions, changing an existing transition, adding method calls that perform an existing transition, removing method calls that perform an existing transition, adding an object map, deleting an object map, changing an object map, adding a state, removing a state, changing a state, adding a state entry method call, deleting a state entry method call, adding a state exit method call, deleting a state exit method call or combinations thereof.

7. The method of claim 1, further comprising receiving a user-generated finite state machine specification at the finite state machine engine.

8. The method of claim 1, further comprising expressing the user-generated finite state machine specification as at least one of an extensible mark-up language document and a diagram in a unified modeling language editing tool.

9. The method of claim 1, further comprising: interpreting a user-generated finite state machine specification containing properties associated with a state, a transition or combinations thereof; and communicating the user defined properties to a computing system.

10. The method of claim 1, wherein each one of the plurality of transitions comprises at least one method invocation on at least one object instance.

11. The method of claim 10, further comprising determining each object instance at runtime.

12. The method of claim 1, further comprising using the plurality of transitions to process event objects comprising computing system context additional to proxy state.

13. The method of claim 1, wherein at least one transition in the plurality of transitions comprises a time-based transition.

14. The method of claim 1, further comprising specifying a notification mechanism to be invoked when processing at least one of the plurality of transitions in the requested instance of the finite state machine specification.

15. A method for utilizing finite state machines in a computing system, the method comprising:
using a finite state machine engine to:
receive a request from a computing system for an instance of a user-generated finite state machine specification comprising a plurality of states and a plurality of transitions;
evaluate the user-generated finite state machine specification for compliance with the schema, the user-generated finite state machine specification comprising a plurality of states and a plurality of transitions
initiate the requested instance of the user-generated finite state machine specification;
create at least one externalized queue; and
record a current state of the initiated requested instance of the user-generated finite state machine in the externalized queue; and
using events from the computing system that correspond to one or more of the plurality of transitions to advance the instance of the user-generated finite state machine specification through the plurality of states.

16. The method of claim 15, further comprising receiving a plurality of requests for concurrent instances of the finite state machine specification at the finite state machine engine; wherein:
the step of initiating the requested instance further comprises using the single finite state machine engine to initiate each one of the requested concurrent instances of the finite state machine specification; and
the step of creating the at least one queue further comprises creating a unique queue for each one of the plurality of concurrent instances of the finite state machine specification.

17. The method of claim 15, wherein the step of creating at least one queue external to the finite state machine engine further comprises creating a proxy to represent a current state of the initiated requested instance of the user-generated finite state machine specification.

18. The method of claim 17, wherein the proxy comprises a Java interface.

19. The method of claim 15, further comprising using the finite state machine engine to:
define a schema comprising validity parameters for a finite state machine;
interpret the user-generated finite state machine specification.

20. A method for utilizing finite state machines in a computing system, the method comprising:
communicating a schema comprising validity parameters for a finite state machine to a finite state machine engine;
using to finite state machine engine to:
evaluate a user-generated finite state machine specification for compliance with the schema, the user-generated finite state machine specification comprising a plurality of states and a plurality of transitions;
interpret the user-generated finite state machine specification;
receive a request from a computing system for an instance of the user-generated finite state machine specification;
initiate the requested instance of the user-generated finite state machine specification; and
create a proxy to control the instance of the user-generate finite state machine specification to represent a current state of the initiated requested instance of the user-generated finite state machine specification; and
using events from the computing system that correspond to one or more of the plurality of transitions to advance the instance of the user-generated finite state machine specification through the plurality of states.

21. A computer-readable storage medium containing a computer-readable code that when read by a computer causes the computer to perform a method for utilizing finite state machines in a computing system, the method comprising:
defining a schema comprising validity parameters for a finite state machine;
evaluating a user-generated finite state machine specification for compliance with the schema, the user-generated finite state machine specification comprising a plurality of states and a plurality of transitions;
interpreting the user-generated finite state machine specification;
receiving a request from a computing system for an instance of the user-generated finite state machine specification;
initiating the requested instance of the user-generated finite state machine specification; and
using events from the computing system that correspond to one or more of the plurality of transitions to advance the instance of the user-generated finite state machine specification through the plurality of states.

22. The computer readable storage medium of claim 21, wherein the method further comprises:
creating at least one externalized queue; and
recording a current state of the initiated requested instance of the user-generated finite state machine in the externalized queue.

23. The computer readable storage medium of claim 21, wherein the method further comprises creating a proxy to represent a current state of the initiated requested instance of the user-generated finite state machine specification.

24. The computer readable storage medium of claim 21, wherein the method further comprises:
  evaluating a user-generated finite state machine specification update for compliance with the schema, the user-generated finite state machine specification update comprising updates to at least one previously interpreted user-generated finite state machine specification;
  interpreting the user-generated finite state machine specification update; and
  updating the previously interpreted user-generated finite state machine specification in accordance with the user-generated finite state machine specification update.

25. The computer readable storage medium of claim 24, wherein the updates comprise adding one or more transitions, deleting one or more transitions, changing an existing transition, adding method calls that perform an existing transition, removing method calls that perform an existing transition, adding an object map, deleting an object map, changing an object map, adding a state, removing a state, changing a state, adding a state entry method call, deleting a state entry method call, adding a state exit method call, deleting a state exit method call or combinations thereof.

26. The computer readable storage medium of claim 21, wherein the method further comprises expressing the user-generated finite state machine specification as an extensible mark-up language document.

27. The computer readable storage medium of claim 21, wherein the method further comprises expressing the user-generated finite state machine specification as a diagram in a unified modeling language editing tool.

28. The computer readable storage medium of claim 21, wherein the method further comprises specifying a notification mechanism to be invoked when processing at least one of the plurality of transitions in the requested instance of the finite state machine specification.

29. A computer-readable storage medium containing a computer-readable code that when read by a computer causes the computer to perform a method for utilizing finite state machines in a computing system, the method comprising:
  receiving a request from a computing system for an instance of a user-generated finite state machine specification comprising a plurality of states and a plurality of transitions;
  initiating the requested instance of the user-generated finite state machine specification;
  creating at least one externalized queue;
  evaluate the user-generated finite state machine specification for compliance with the schema, the user-generated finite state machine specification comprising a plurality of states and a plurality of transitions
  recording a current state of the initiated requested instance of the user-generated finite state machine in the externalized queue; and
  using events from the computing system that correspond to one or more of the plurality of transitions to advance the instance of the user-generated finite state machine specification through the plurality of states.

30. The computer readable storage medium of claim 29, wherein the step of receiving the request further comprises receiving the request at a single finite state machine engine.

31. The computer readable storage medium of claim 30, wherein the method further comprises receiving a plurality of requests for concurrent instances of the finite state machine specification;
  wherein:
    the step of initiating the requested instance further comprises using the single finite state machine engine to initiate each one of the requested concurrent instances of the finite state machine specification; and
    the step of creating the at least one queue further comprises creating a unique queue for each one of the plurality of concurrent instances of the finite state machine specification.

32. The computer readable storage medium of claim 29, wherein the step of creating at least one queue external to the finite state machine engine further comprises creating a proxy to represent a current state of the initiated requested instance of the user-generated finite state machine specification.

33. The computer readable storage medium of claim 29, wherein the method further comprises:
  defining a schema comprising validity parameters for a finite state machine;
  interpreting the user-generated finite state machine specification.

* * * * *